US006789327B2

(12) United States Patent
Roth et al.

(10) Patent No.: US 6,789,327 B2
(45) Date of Patent: Sep. 14, 2004

(54) TOUCH PROBE WITH DEFLECTION MEASUREMENT AND INSPECTION OPTICS

(75) Inventors: Roland Roth, Waldstetten (DE); Karl Seitz, Oberkochen (DE); Kurt Brenner, Satteldorf (DE); Uwe Brand, Isernhagen (DE); Wolfgang Hoffmann, Bergfeld (DE); Thomas Kleine-Besten, Braunschweig (DE); Sebastian Bütefisch, Braunschweig (DE); Stephanus Büttgenbach, Sickte (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 10/646,342

(22) Filed: Aug. 22, 2003

(65) Prior Publication Data
US 2004/0118000 A1 Jun. 24, 2004

Related U.S. Application Data

(63) Continuation of application No. PCT/EP02/01958, filed on Feb. 25, 2002.

(30) Foreign Application Priority Data

Feb. 23, 2001 (DE) ........................................ 101 08 774

(51) Int. Cl.⁷ ............................................. G01B 5/008
(52) U.S. Cl. ......................................... 33/556; 33/559
(58) Field of Search ....................... 33/556, 558, 561, 33/559

(56) References Cited

U.S. PATENT DOCUMENTS

| | | | |
|---|---|---|---|
| 4,530,159 A | | 7/1985 | Ernst .......................... 33/169 R |
| 4,792,698 A | * | 12/1988 | Pryor .................... 250/559.23 |
| 5,103,572 A | * | 4/1992 | Ricklefs ...................... 33/558 |
| 5,390,424 A | * | 2/1995 | Butter et al. .................. 33/561 |
| 5,505,005 A | * | 4/1996 | McMurtry et al. ............. 33/561 |
| 5,524,354 A | | 6/1996 | Bartzke et al. ............... 33/561 |
| 5,615,489 A | | 4/1997 | Breyer et al. ................. 33/503 |
| 5,825,666 A | | 10/1998 | Freifeld ...................... 364/560 |
| 6,516,529 B2 | * | 2/2003 | Hidaka et al. ................ 33/561 |
| 6,708,420 B1 | * | 3/2004 | Flanagan ..................... 33/556 |

FOREIGN PATENT DOCUMENTS

| | | | |
|---|---|---|---|
| DE | 35 02 388 A1 | 9/1985 | ........... G01B/11/03 |
| DE | 42 44 240 A1 | 6/1994 | ........... G01B/11/03 |
| DE | 42 43 284 C2 | 9/1996 | ........... G01B/7/012 |
| DE | 298 23 884 U1 | 3/2000 | ........... G01B/11/03 |
| EP | 0 614 517 B1 | 3/1997 | ........... G01B/21/04 |
| EP | 0 995 967 A1 | 4/2000 | ........... G01B/11/03 |
| GB | 2238616 A * | 6/1991 | ........... G01B/21/20 |
| WO | WO 99/53268 | 10/1999 | ........... G01B/11/00 |
| WO | WO 99/53269 | 10/1999 | ........... G01B/11/00 |

OTHER PUBLICATIONS

"Miniaturisierter 3D–Tastsensor für die Metrologie an Mikrostrukturen", T. Kleine–Besten et al.; tm—Technisches Messen 66 (1999) 12, 490–495, with Translation.

* cited by examiner

Primary Examiner—Diego Gutierrez
Assistant Examiner—Amy R. Cohen
(74) Attorney, Agent, or Firm—Osha & May L.L.P.

(57) ABSTRACT

A touch probe 9 for a coordinate measuring apparatus is proposed which includes a touch probe chassis 29 adapted to be attached to the coordinate measuring apparatus, a support for the sensing stylus 39 which is mounted on the touch probe chassis 29 so as to be deflectable from a rest position and on which a sensing stylus 47 is mountable for contacting a workpiece 17, a deflection measuring system 55, 57 for detecting a deflection of the support for the sensing stylus 39 with respect to the touch probe chassis 29 and an inspection optics 61 for inspecting a tip 49 of the sensing stylus 47. The touch probe 1 is characterized in that at least one of the components support for the sensing stylus 39 and touch probe chassis 29 comprises a transverse support 39 which extends transversely to a direction of extension of the sensing stylus 47 and which is transparent to light in at least a portion thereof and which is disposed in a beam path 69 of the inspection optics 61.

17 Claims, 7 Drawing Sheets

TOUCH PROBE WITH DEFLECTION MEASUREMENT AND INSPECTION OPTICS

This application is a contraction of PCT/EP02/01958 filed on Feb. 25, 2002.

BACKGROUND OF THE INVENTION

The invention relates to a coordinate measuring apparatus having a sensing stylus for contacting a workpiece. Furthermore, the invention relates to a touch probe for a coordinate measuring apparatus, wherein the touch probe is provided for supporting the sensing stylus and for detecting a contact between sensing stylus and workpiece. Moreover, the invention relates to a method of contacting a workpiece by means of a coordinate measuring apparatus.

BRIEF SUMMARY OF THE INVENTION

Conventional coordinate measuring apparatuses include a workpiece mount for mounting a workpiece to be measured and contacted, respectively, and a touch probe which is movable in space with respect to the workpiece mount. A sensing stylus is supported on the touch probe in a rest position with respect to the touch probe, wherein the touch probe detects deflections of the sensing stylus from its rest position. For determining coordinates of a surface of the workpiece, the touch probe is moved in space with respect to the workpiece mount until a tip of the sensing stylus comes into touching contact with the surface of the workpiece. To this end, the tip of the sensing stylus is moved towards the workpiece surface until contacting of the workpiece by the sensing tip is detected by the touch probe through a deflection of the sensing tip from its rest position. The relative position of the touch probe with respect to the workpiece mount and thus, the coordinates of the workpiece surface are then determined in a suitable coordinate system. Further coordinates of surface points of the workpiece can be determined in a similar manner.

In view of a rapid scanning of the workpiece surface approaching of the sensing tip to the workpiece surface should be as a rapid relative movement between touch probe and workpiece mount. However, such approaching also has to be carefully performed in order to prevent components of the touch probe and the sensing tip from being damaged when the movement of the touch probe relative to the workpiece cannot be stopped as quickly as required upon contact with the latter.

Therefore, the sensing tip is approached to the workpiece under the inspection of a user, who may inspect with the eye that the sensing tip approaches the workpiece and may then reduce the approach speed. Furthermore, the user also selects with the eye those surface parts and geometry elements of the workpiece which currently are to be contacted. For this purpose, in conventional coordinate measuring apparatuses, the user directly inspects with his eye the sensing tip and the workpiece.

In miniaturized workpieces and complicated workpiece geometries, the direct inspection of the sensing tip and the workpiece surface possibly may be laborious or even impossible for the user.

A coordinate measuring apparatus is known from EP 0 614 517 B1, wherein the user does not inspect with the free eye the sensing tip and the workpiece, but looks at a monitor presenting an image of the region around the sensing tip. To record the monitor image, the coordinate measuring apparatus carries next to the touch probe a camera having an objective which are aligned relative to each other such that the camera provides an image of the sensing tip and the region of the workpiece surface which is approached by the sensing tip.

It has been found that the structure of this conventional coordinate measuring apparatus cannot be adapted satisfactorily to certain applications.

Accordingly, it is an object of the present invention to provide a coordinate measuring apparatus comprising an inspection optics for inspecting the sensing tip, wherein the coordinate measuring apparatus is suitable for further kinds of applications.

Furthermore, it is an object of the invention to provide a touch probe for such coordinate measuring apparatus. A further object of the invention is to provide a touch probe of the type which allows for reliable inspection of the sensing tip or/and for greater miniaturization of the touch probe. Moreover, it is an object of the invention to provide a corresponding method of contacting a workpiece.

To this end, the invention proceeds from a touch probe comprising a touch probe chassis which forms a supporting structure for components of the touch probe and which is adapted to be fixedly attached to the coordinate measuring apparatus. On the touch probe, there is provided a support for a sensing stylus, on which support a sensing stylus is mountable for contacting the workpiece and which is deflectable from a rest position with respect to the touch probe chassis. A deflection measuring system is provided, for detecting a deflection of the support for the sensing stylus with respect to the touch probe chassis, and to allow a user to inspect the tip of the sensing stylus or/and a region around the tip of the sensing stylus tip as well as its approach to the workpiece, an inspection optics is additionally mounted on the chassis.

SUMMARY OF THE INVENTION

In one aspect, The invention is based on the finding that the side-by-side attachment of inspection optics and touch probe in the above-described conventional coordinate measuring apparatus results in restrictions regarding geometry and, in particular, makes it difficult to miniaturize the system consisting of touch probe and inspection optics. Therefore, the invention is based on the idea of integrating the inspection optics into the touch probe, so that the inspection optics "looks through" the touch probe.

To this end, the inspection optics is designed to also image a region around the tip of the sensing stylus. In the object plane of the inspection optics the imaged region here has a diameter which is greater than a diameter of a touching body provided at the sensing tip for contacting the workpiece. Preferably, here the diameter of the imaged region is many times the diameter of the touching body, in particular, more than five times, ten times or, more preferably, even more than twenty times the diameter of the touching body.

In one aspect, the inspection optics is designed such that it may gain a high-contrast image of a workpiece, when the latter approaches the tip of the sensing stylus tip. If necessary, an illumination is to be also provided here to illuminate the workpiece in the region around the tip of the sensing stylus. It is also possible that the workpiece be illuminated through the inspection optics itself.

In one aspect the touch probe according to the invention may be characterized in that a transverse support, i.e., a supporting component of the touch probe extending transversely to the direction of extension of the sensing stylus, is located in a beam path of the inspection optics. This transversely extending supporting component may be located, in particular, in the line of transmission of mechanical force between the support for the sensing stylus and the coordinate measuring apparatus and, in particular, in the line of transmission of mechanical force between the support for the sensing stylus and the chassis and may be part of the support for the sensing stylus or/and the chassis or/and a further component provided between chassis and support for the sensing stylus.

That the transversely extending supporting component is disposed in the beam path of the inspection optics, here means that lines of the geometric beam path between a focal plane of the inspection optics in which, for example, the sensing stylus tip may be disposed, and an entrance lens of the inspection optics, intersect this transversely extending component. Hence, this transverse support is in principle able to at least partly cover the image plane of the inspection optics. To nevertheless ensure the desired possibility of inspection through the inspection optics, the transverse support is transparent to light at least portions at portions thereof.

Hence, the tip of the sensing stylus on the one hand, and a region around the tip, on the other hand, are intended to be inspected by means of the inspection optics. To this end, the inspection optics is adapted to a length of the sensing stylus and thus, for example, to a distance between the transverse support and the tip of the sensing stylus, such that the tip of the sensing stylus is located near an object plane of the inspection optics. In particular, this is the case when an amount of a ratio of a first distance D1 between the transverse support and the object plane over a second distance D2 between the transverse support and the tip of the sensing stylus is within a range of from 0.5 to 2.0, preferably, 0.75 to 1.4 and, more preferably, 0.85 to 1.2.

This is preferably achieved by the transverse support itself being made of a material which is transparent to radiation. For this purpose, it is particularly preferred, when the transverse support itself is made of glass.

As an alternative here, it is preferably also possible to provide the transverse support with one or a plurality of apertures such that, on the one hand, its supporting function is maintained and, on the other hand, sufficient possibilities are created for radiation to pass the transverse support between the object plane and an entrance lens of the inspection optics. To this end, the transverse support may be formed by a plurality of strips of material between which gaps are provided for the passage of light. The transverse support may be formed as a net or grid, it may be formed as a perforated surface or its components providing for the supporting function may be as narrow as to maintain a sufficiently great surface for the passage of light.

Advantageously, an optical main axis of the inspection optics and a longitudinal axis of the sensing stylus substantially coincide. The viewing direction of the user on the workpiece consequently corresponds to the direction of extension of the sensing stylus.

Preferably, the part of the support for the sensing stylus on which the foot of the sensing stylus is directly mounted, is located on or near the main axis of the inspection optics. When seen in this main axis, a sufficient surface for apertures and transparent bodies, respectively, is then provided around the foot of the sensing stylus to allow the view on the sensing tip.

According to a preferred embodiment of the invention, the transverse support is elastically deformable and formed as a component to elastically couple the base bodies of the chassis and the support for the sensing stylus. The transverse support may then be provided to define the rest position of the support for the sensing stylus with respect to the touch probe chassis and to also provide a restoring force against deflections from this rest position.

With regard to a miniaturization of the arrangement and to well-defined restoring forces, the transverse support and components of the touch probe chassis and the support for the sensing stylus are integrally made from one block of material.

Preferably, the block of material is a monocrystal which is made of silicon for example. Advantageously, etching techniques are employed for producing the desired shape of the components.

In one aspect the deflection measuring system is preferably provided such that it detects elastic deformations of the transverse support and/or of regions of the touch probe chassis, or the support for the sensing stylus. To this end, preferably resistance strain gauges are provided, which are provided in regions on the transverse support or/and regions of the touch probe chassis or/and the support for the sensing stylus. It is also possible that the resistance strain gauges be integrated into these components.

Furthermore, the invention provides a coordinate measuring apparatus comprising the above-described touch probe, and the invention further provides a method of contacting a workpiece, in which, through the inspection optics integrated into the touch probe, a user is allowed to inspect the sensing stylus tip and the workpiece to be contacted, respectively.

BRIEF DESCRIPTION OF DRAWINGS

Embodiments of the invention will be illustrated hereinafter in more detail with reference to drawings, wherein.

DETAILED DESCRIPTION

Figure 1:
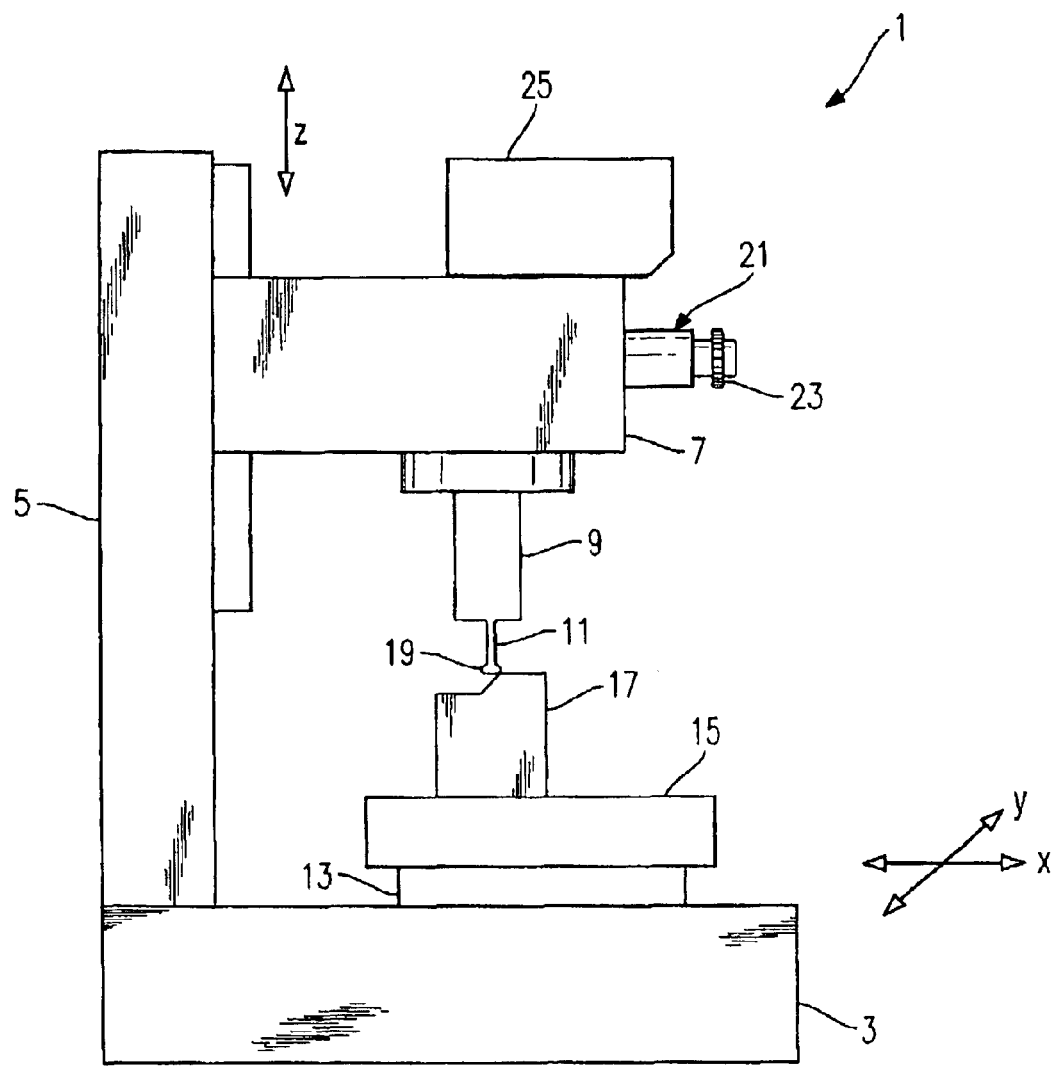
FIG. 1 is a schematic representation of a coordinate measuring apparatus.

FIG. 1 shows a coordinate measuring apparatus 1 according to the invention comprising a base part 3 and a stand 5 attached thereto, on which a touch probe mount 7 is mounted so as to be displaceable in vertical direction (z-direction). The touch probe mount 7 carries a touch probe 9 on which a sensing stylus 11 is mounted. A moving table 13 is provided on the base part 3 which carries a workpiece mount 15 so as to be displaceable in the horizontal plane (x-direction, y-direction). On the workpiece mount 15 there is mounted a workpiece 17 which is to be measured by the coordinate measuring apparatus 1. To this end, a user moves the touch probe 9 until a tip 19 of the sensing stylus 11 comes into contact with a desired location on the surface of the workpiece 17. As soon as the sensing stylus tip 19 comes into contact with the workpiece 17, the sensing stylus 11 is deflected from its rest position on the touch probe and this deflection is detected by the coordinate measuring apparatus, whereupon the latter detects the coordinates x, y, z of the contact point between workpiece 17 and tip 19 of the sensing stylus.

For a careful approach of the sensing stylus tip 19 to the workpiece 17 and for preventing the sensing stylus 11 from being damaged on approach to the workpiece 17, the user inspects the sensing tip 19 during approach or in breaks between steps of approach through an inspection optics 21 of which components are disposed in the touch probe 9 and are not shown in FIG. 1. Shown in FIG. 1 is an ocular 23 of the inspection optics as well as a camera 25 of the latter.

Figure 2:
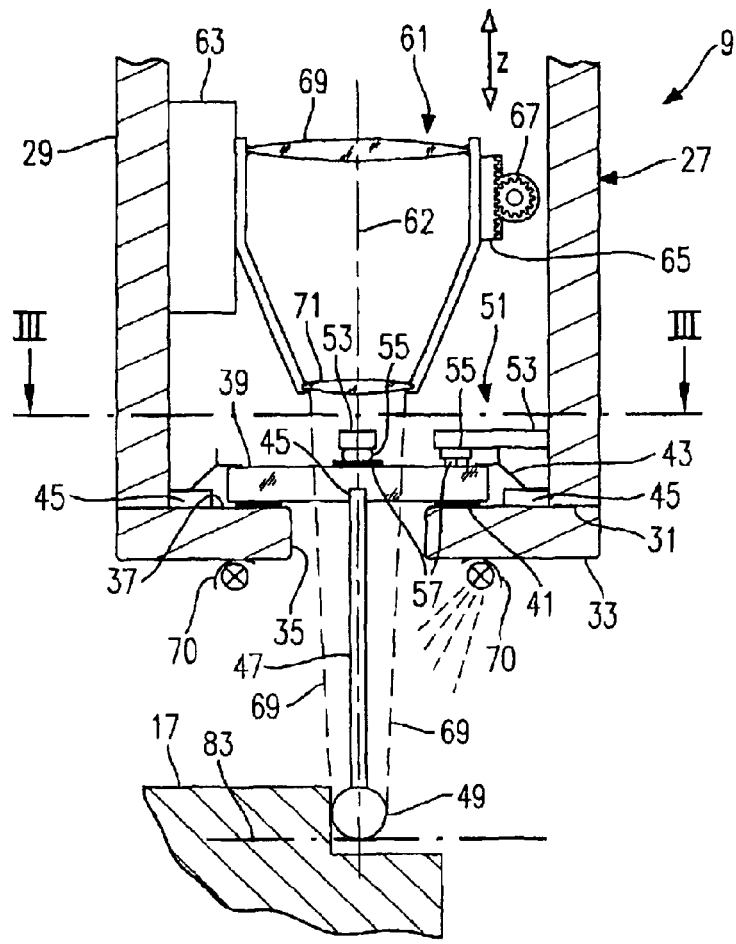
FIG. 2 is a schematic sectional view of a touch probe of the coordinate measuring apparatus of FIG. 1.
Figure 3:
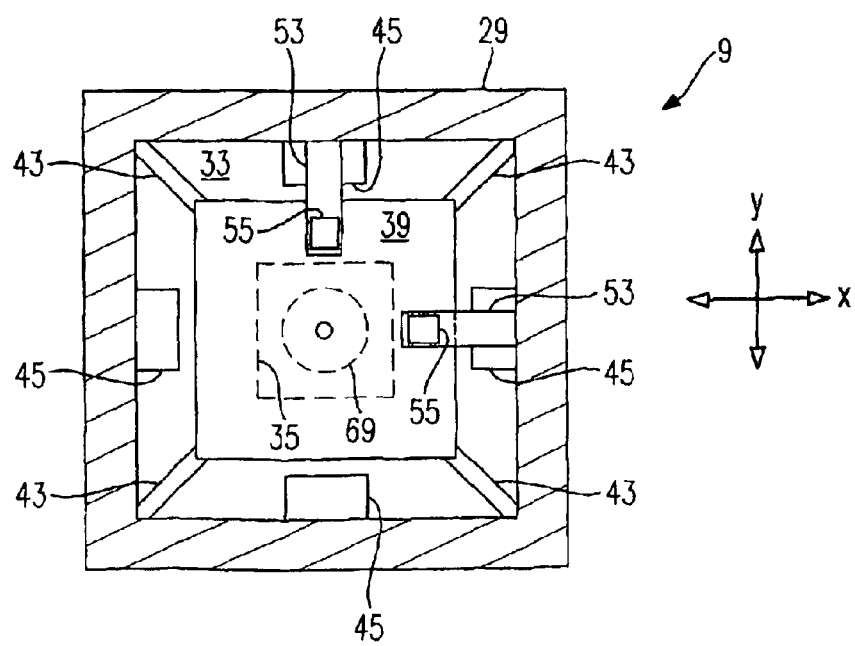
FIG. 3 is a representation of the touch probe of FIG. 2 and cut along a line III—III of FIG. 2.

FIGS. 2 and 3 show the touch probe 9 in detail. The touch probe 9 comprises a touch probe chassis 27 comprising a tube 29 of rectangular cross-section and a base plate 33 attached to a front end 31 of the tube 29. The end of the tube 29 opposed to the front end 31 is fixedly mounted on the touch probe mount 7 of the coordinate measuring apparatus 1 and thus, also the chassis 27 is fixedly mounted on the touch probe mount 7.

The base plate 33 which is horizontally aligned when the coordinate measuring apparatus 1 is in operation includes a central square aperture 35, the peripheral walls of which are spaced from inner walls of the tube 29. A glass plate 39 is placed on an upper side 37 of the base plate 33 so as to be displaceable in horizontal direction. To reduce a frictional resistance to displacement of the glass plate 39 relative to the base plate 33, an oil film 41 is provided between the base plate 33 and the glass plate 39 to extend around the aperture 35 like a ring.

The glass plate 39 is held in a central rest position on the base plate 33 and within the tube 29 by means of springs 43. Each spring 43 is fixed with its one end to the base plate 33 at a corner of the tube 29 and with its other end to a corresponding upper corner of the glass plate 39.

The glass plate 39 is displaceable horizontally from its rest position against a restoring force of the springs 43, wherein four stops 45 restrict this horizontal displacement. The stops 45 are formed as small blocks which rest on the base plate 33 with the bottom faces thereof and which are adjacent to the inner walls of the tube 29 with the sides thereof. The stops 45 are respectively centred on the inner walls of the tube 29.

In the center of the glass plate 39, a bore 45 is provided from the bottom side of the glass plate 39, into which an end or a foot of a sensing stylus 47 is adhered. On the other end of the sensing stylus 47 which is not fixed to the glass plate 39, the latter carries a ruby ball 49 which forms the sensing tip of the coordinate measuring apparatus 1 and which, for contacting the workpiece 17, is to be brought into touching contact with the workpiece surface.

If the sensing tip 49 comes into lateral contact with the surface of the workpiece by moving the touch probe 9 relative to the workpiece 17, a pressing force will result therefrom which causes a horizontal displacement of the glass plate 39 against the effect of springs 43 from its rest position with respect to the chassis 27 of the touch probe 9.

The displacement of the plate 39 from the rest position can be determined by means of a measuring system 51. The latter comprises two sensor supports 53 which are respectively fastened centrally on two adjacent side walls of the tube 29 and project horizontally beyond the glass plate 39. Each sensor support 53 carries on its bottom side an optical sensor 55 such that it is disposed a slight distance above the surface of the glass plate 39. On the upper side of the glass plate 39 marking lines 57 are provided in regions below the sensors 55 to be optically scanned by the sensors 55. A displacement of the glass plate 39 and thus of graduation marks 57 will be detected by the sensors 55 and converted into a corresponding measuring signal on the basis of which a central controller of the coordinate measuring apparatus 1 is capable of detecting by value the displacement of the glass plate 39 from the rest position.

In addition to the ocular 23 and the camera 25 (FIG. 1), the inspection optics 21 further comprises an objective 61 mounted on the chassis 27 via a movable mount 63 which is fixed inside of the tube 29. The objective 61 is displaceable in z-direction with respect to the chassis 27 by means of a driving system comprising a toothed rack 65 which is fixed at the objective 61 and has engaged therein a driving pinion 67 to be actuated from outside.

The objective 61 comprises an exit lens 69 facing the ocular 23 and an entrance lens 71 which faces the tip 49 and is disposed inside of the tube 29 and above the glass plate 39. Driving system 65, 67 serves to adjust the position of an object plane 83 of the objective 61 to a length of the sensing stylus 47 currently used. A user will adjust the position of the objective 61 in z-direction such that the object plane 83 is disposed in the region of the sensing tip 49 or somewhat below.

The object plane and the sensing tip 49, respectively, are observed by objective 61 through the glass plate 39. Here, parts of the sensing stylus and, in the embodiment according to FIG. 2, the entire sensing stylus 47 and its foot 45 which is fixed at the glass plate 39, are disposed in a beam path of the objective 61. This is evident also from the fact that peripheral beams of the beam path, i.e., beams that enter the entrance lens 71 of the objective 61 the furthest out of center as possible, and which are designated by reference numeral 69 in FIGS. 2 and 3, surround the sensing stylus 47 and the location 45 at which the latter is mounted on the glass plate 39 in the x-y-plane. Although structures and non-transparent components of the touch probe 9 such as the foot 45 of the sensing stylus 47 are disposed within the beam path of the objective 61 and partly block entering beams of the objective, the objective 61 nevertheless generates an image of the object plane of the objective, which is clearly visible for the user.

FIG. 2 further schematically shows an illumination device 70 for illuminating a region around the sensing stylus tip 49.

All in all, as the objective 61 is disposed within the chassis 27 such that supporting structures are traversed by a beam path of the objective, there is provided a compact figuration for a touch probe having an inspection optics. The supporting structure traversed by a beam path is the glass plate 39 has the function of a support for the sensing stylus displaceable from a rest position with respect to the chassis.

Variants of the invention will be illustrated below. Components corresponding in function are assigned the reference numerals of FIGS. 1 to 3 and are supplemented with an additional letter for distinction. For explanation, reference is made to the entire preceding description.

Figure 4:
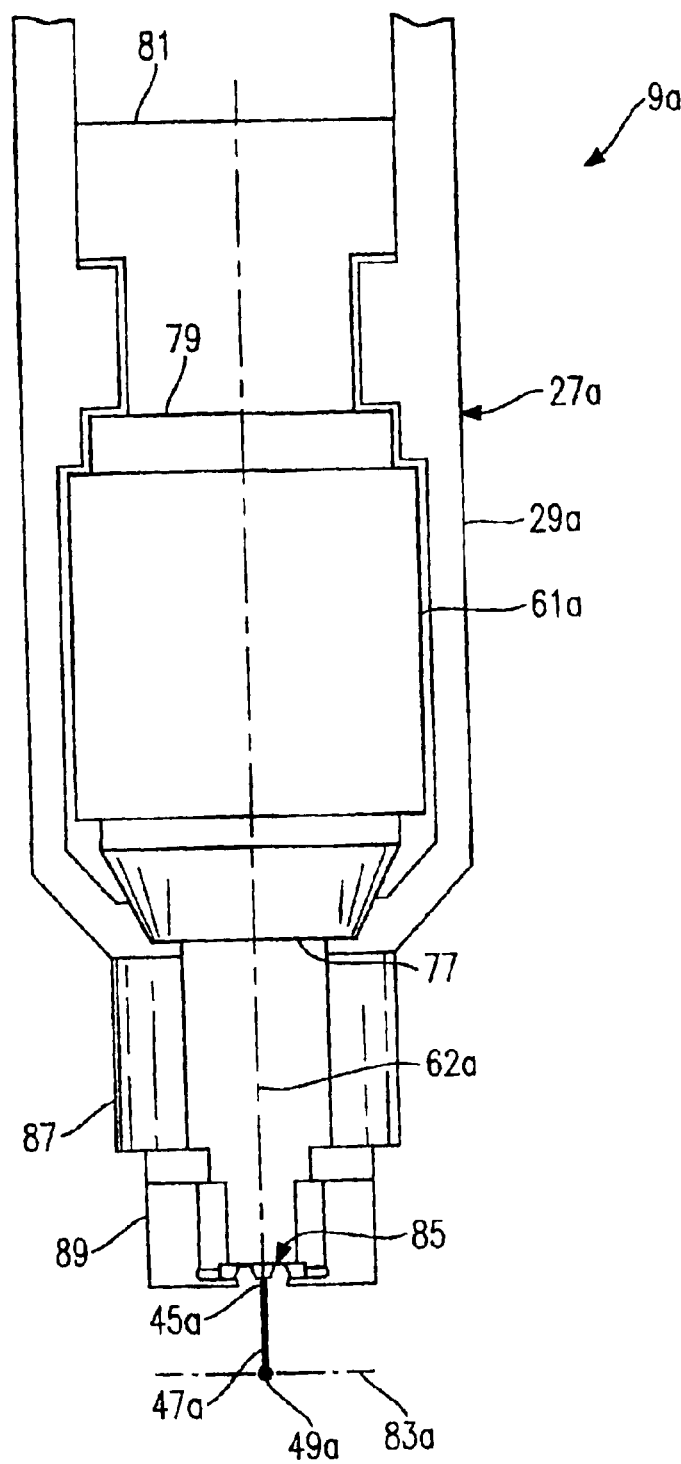
FIG. 4 is a further embodiment of a touch probe for the coordinate measuring apparatus of FIG. 1.

FIG. 4 shows a touch probe 9a having a chassis 27a adapted to be attached to a coordinate measuring apparatus, as is shown, for example, in FIG. 1. Chassis 27a comprises as a supporting structure for further components a tube 29a, having inside an objective 61a which comprises an entrance side 77 facing towards an object plane 83a and an exit side 79 opposing the entrance side and having directly connected thereto a camera 81.

In the object plane 83a, a tip 49a of a sensing stylus 47a is disposed, which is fixed to a sensor system 85 with its other end 45a.

The sensor system 85 is also mounted on the chassis 27a by attaching to the front end of the tube 29a a distance sleeve 87, which carries an annular mount 89 for the sensor system 85 and has the latter arranged in front of the objective 61a such that the direction of extension of the sensing stylus 47a substantially coincides with the optical axis 62a of the objective 61a.

Figure 5:
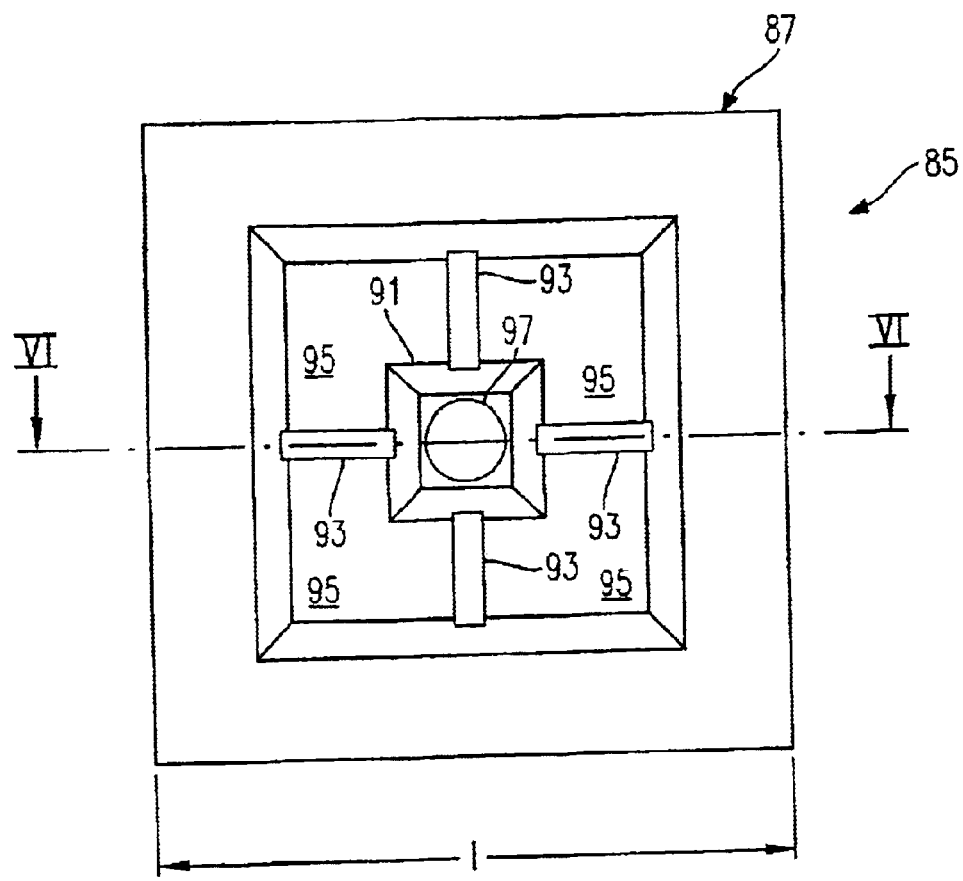
FIG. 5 is a representation of a component of the touch probe of FIG. 4 in plan view.
Figure 6:
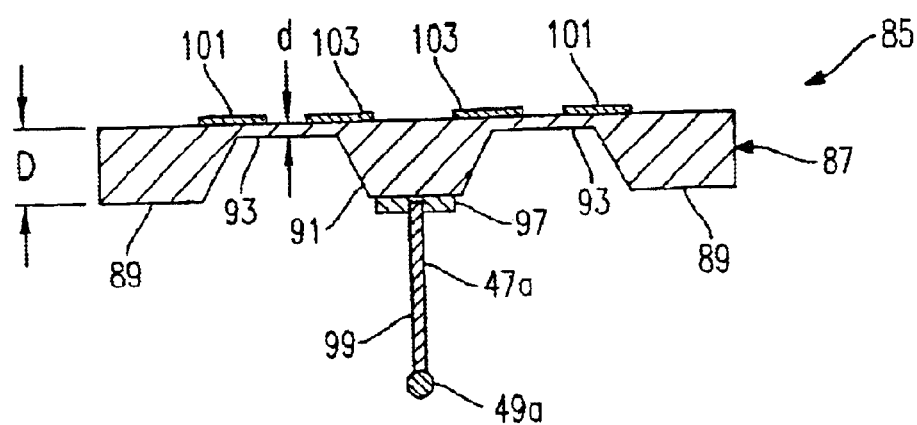
FIG. 6 is a sectional view of the component of FIG. 5 taken along a line VI—VI of FIG. 5.

The sensor system 85 is shown in detail in FIGS. 5 and 6.

It comprises a body 87 made of a silicon monocrystal having a (100)-plane in the plane of drawing of FIG. 5. The structure of the silicon body 87 was made from a fullbody by etching.

An outer periphery of the silicon body 87 is formed by a square frame member 89. In the embodiment described here, the frame member has an edge length 1 of 6 mm, and a profile thickness D of the frame 89 is 0.5 mm. However, also greater or smaller dimensions can be used for the frame member.

A support for the sensing stylus 91 is centrally suspended in the frame 89 by four strips 93, each of which extends inwardly and is centered on sides of the frame 89 (in the plan view of FIG. 5). An aperture 95 is provided on either side of each holding strip 93 to allow the passage of light beams from the object plane 83a to the entrance side 77 of the objective 61a. In the plane of drawing of FIG. 5 each aperture 95 is limited by two sides of the frame 89, by two strips 93 and by the support for the sensing stylus 91.

In the illustrated embodiment the strips 93 have a substantially smaller thickness d of 30 μm as compared to the profile thickness D of the frame 89 and thus, even if the bending forces are comparatively small, they will already exhibit a noticeable elastic deformability. Hence, the support for the sensing stylus 91 is held by the strips 93 in the frame 89 in a rest position from which it is elastically deflectable. Greater or smaller values can be also used for thickness d.

The sensing stylus 47a includes a foot 97 of a diameter of 1 mm which is adhered to the support for the sensing stylus 91 and into which a shaft 99 of a thickness of 0.2 mm and a length of 8 mm is inserted, whose end carries the ruby ball 49a of a diameter of 0.3 mm. Here, the dimensions of the sensing stylus 47a are also stated by way of example only and other values can be used as well.

On a portion of each strip 93 facing away from the sensing tip 49a two resistance strain gauges, on piezo resistors, are provided, i.e., a resistor 101 which extends from a region of the frame 89 close to the strip 93 to a region of the strip 93 close to the frame 89, and a further resistor 103, which extends from a region of the strip 93 close to the support for the sensing stylus 91 to a region of the support for the sensing stylus 91 close to the strip 93. With all of these 8 resistance strain gauges 101, 103, of which the electric connection is not shown in FIGS. 5 and 6, the deflection of the support for the sensing stylus 91 from the rest position shown in FIGS. 5 and 6 can be determined by means of a control system also not shown in the Figures, as can be derived in more detail from the FIGS. 7 and 8.

Figure 7:
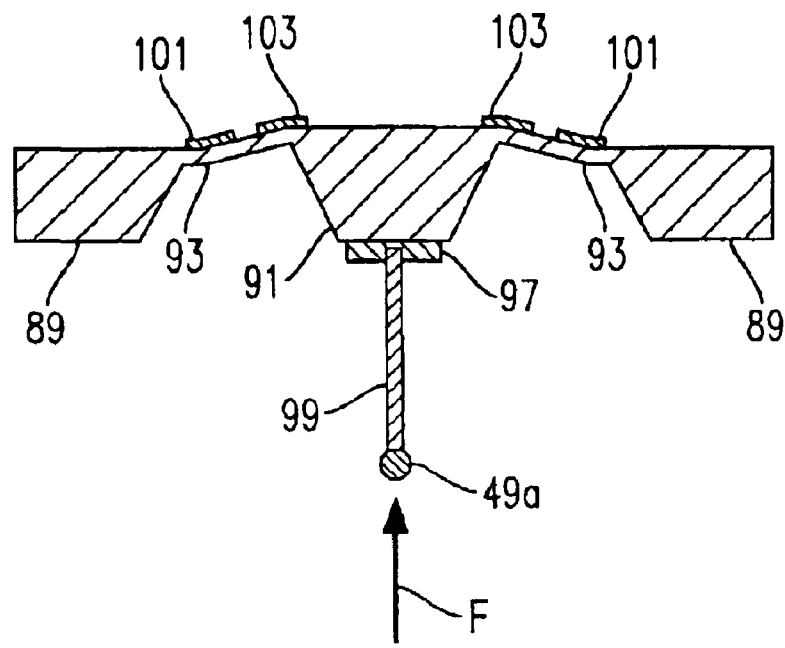
FIG. 7 is a representation of the component of FIGS. 5 and 6 with mounted sensing stylus and deflection from the rest position.

FIG. 7 shows a situation in which a force F acts on the tip 49a which is oriented in the direction of extension of the shaft 99. As can be seen from FIG. 7, this results in an extension of the resistance strain gauge 103 close to the support for the sensing stylus 91 and to a compression of the other gauges 101 close to the frame 89.

Figure 8:
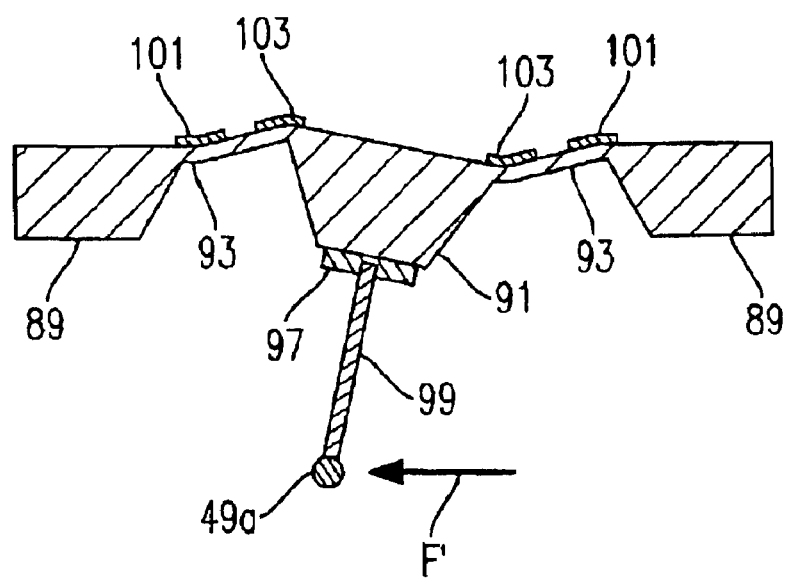
FIG. 8 is a representation corresponding to FIG. 7 having a different deflection from the rest position.

FIG. 8 shows a situation in which a force F' acts on the tip 49a, which is oriented perpendicularly to the direction of extension of the shaft 99. The result is that out of the resistance strain gauges 101 close to the frame and the resistance strain gauges 103 close to the support for the sensing stylus and shown in FIG. 8, one at a time is compressed and one is extended, wherein out of the resistance strain gauges 101, 103 of each holding strip 93 one is compressed and the other one is extended.

By reading the measuring signals provided by the resistance strain gauges 101, 103, and by evaluation of the same, the force acting on the sensing tip 49a is derivable in respect of both its amount and its direction.

On the one hand, consequently the sensor has the function of supporting the sensing stylus 47a so as to be displaceable with respect to the chassis and, on the other hand, it has the function of measuring the deflection of the support for the sensing stylus 91 with respect to the chassis. To this end, the sensor components 91 and 89 are elastically connected with each other via the holding strips 93. Component 91 serves as a direct support for the sensing stylus, and the frame 89 is fixedly connected with the remaining chassis 27a of the touch probe and may be attributed to the chassis 27a with regard to its mechanical function. All strips 93 contribute to form a transverse support which connects the support for the sensing stylus 91 with the chassis 27a and the frame 89, respectively, and which extends transversely to the direction of extension of the shaft 99. The so formed transverse support has a plurality of apertures 95, so that it is designed to be transparent to light in portions to allow an inspection of the sensing tip 49a with the objective 61a, wherein the transverse support 93 is disposed between the tip 49a and the entrance side 77 of the objective 61a.

As an alternative to placing resistance strain gauges on the strips 93 on their side facing away from the tip 49a, it is also possible to place the resistance strain gauges on the side facing towards the tip 49a. Also, it is possible to design the strain sensor by directly doping the strips 93 or regions of the frame part 89 adjacent thereto. Suitable dopants are introduced into the silicon in such concentration that the latter exhibits piezoelectric effects.

Figure 9:
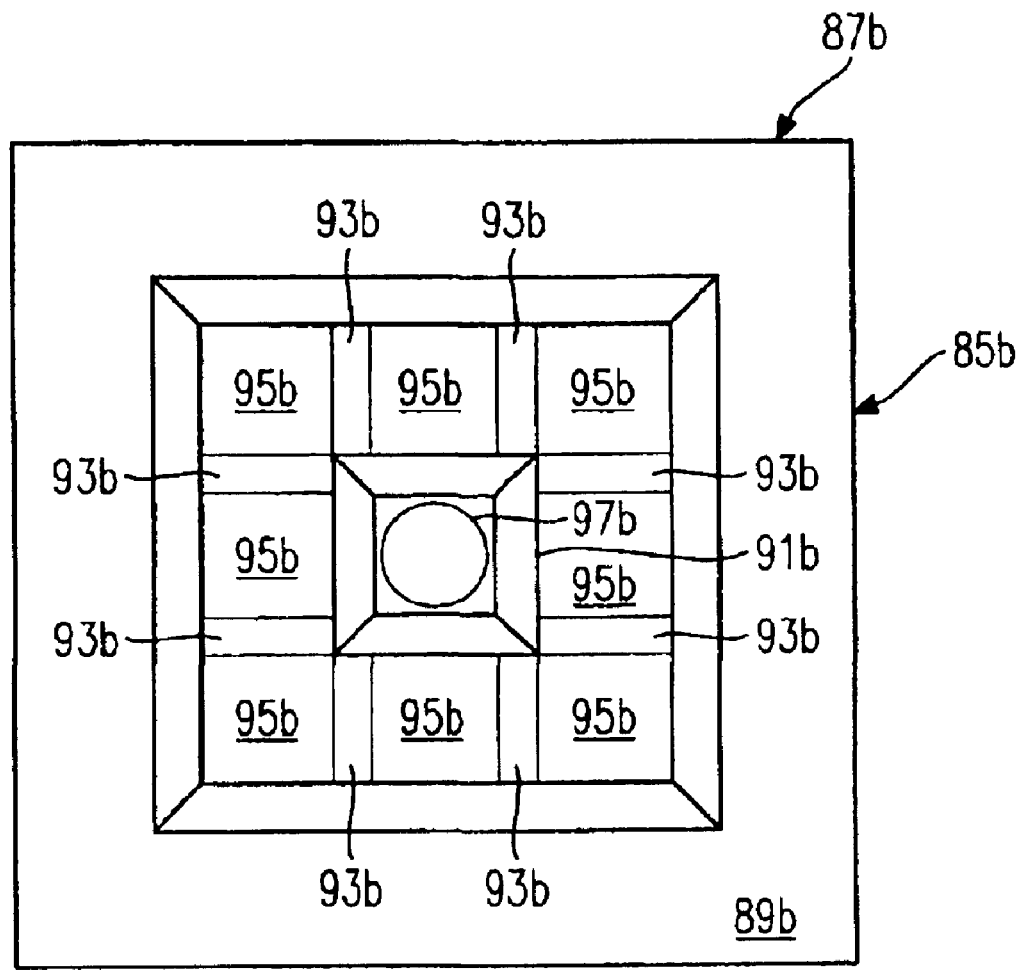
FIG. 9 is a variant of the component shown in FIG. 5.

FIG. 9 shows a variant of the sensor system illustrated in FIGS. 5 and 6. A silicon body 87b of FIG. 9 differs from that shown in FIGS. 5 and 6 in that here a sensing stylus holder 91b is mounted on a frame part 89b of the sensor system 85b by means of eight thin holding strips 93b. Between each pair of adjacent holding strips 93b an aperture 95b is provided to allow the passage of light for the inspection of an object plane by means of an objective.

Figure 10:
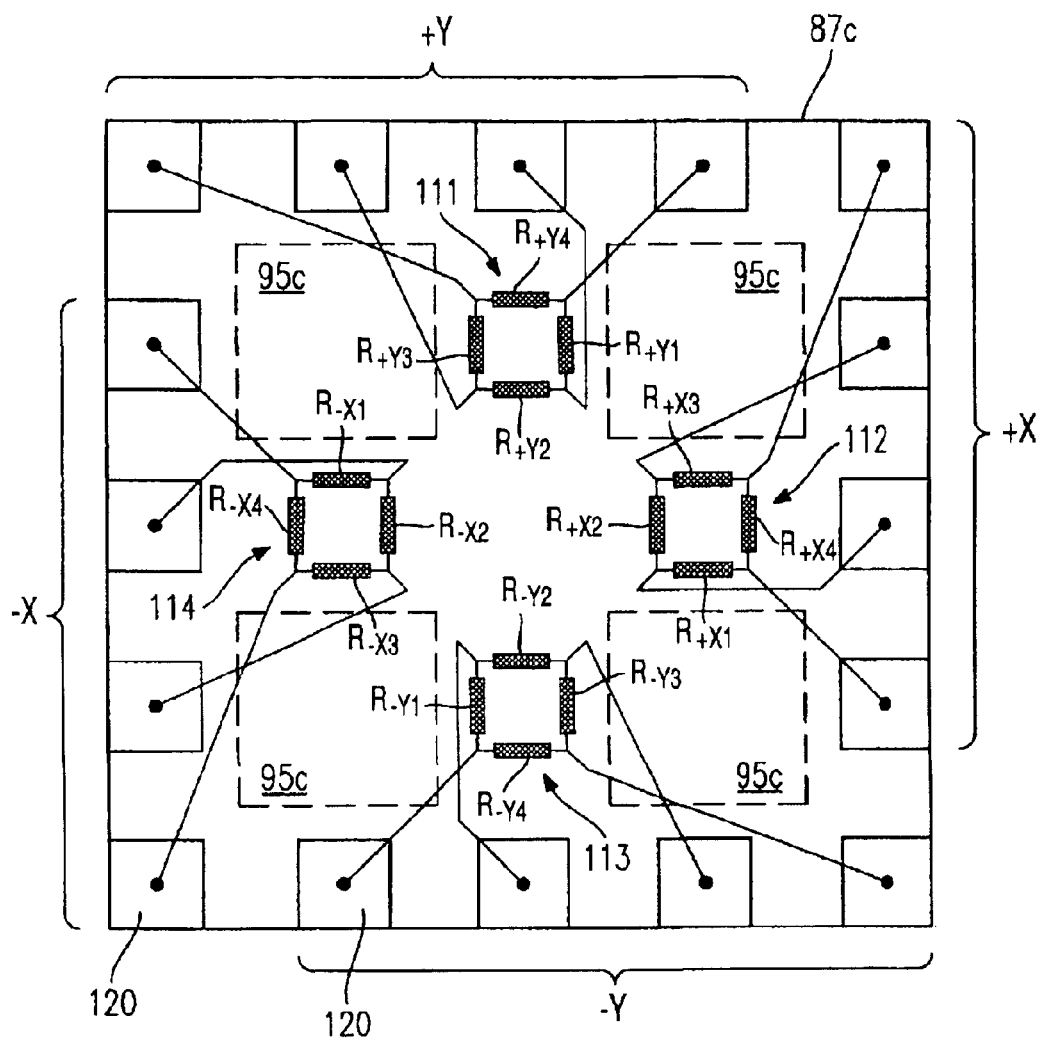
FIG. 10 is a further variant of the component shown in FIG. 5
Figure 11:
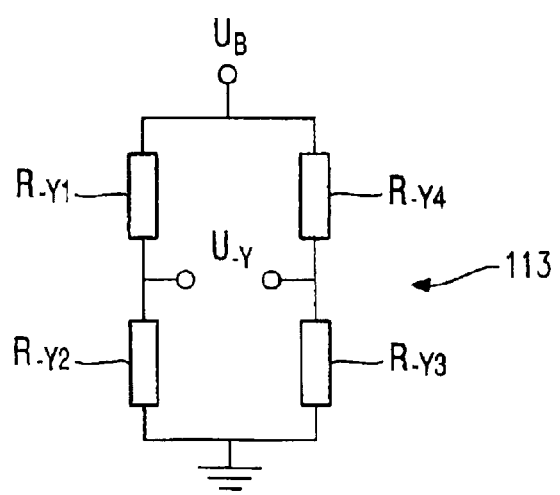
FIG. 11 is a detail of FIG. 10.

FIGS. 10 and 11 show a further variant of the sensor system illustrated in FIGS. 5 and 6. Here, a design of the sensors as measuring bridges is explained in detail. Apertures 95a in a silicon chip 87c are illustrated in FIG. 10 only by broken lines. In a center of the silicon chip 87c a sensing tip is fixed, which is not shown in FIG. 10.

Distributed along the edges of the silicon chip 87c are sixteen contact pads and electric connecting regions, respectively. To measure deformations in the silicon chip, four full measuring bridges 111, 112, 113 and 114 are disposed thereon, the resistances of which are formed by locally doping the silicon of the silicon chip 87c or by other techniques and which, through wirings, shown diagrammatically in FIG. 10, are connected with connections 120, wherein these wirings are also provided by doping or other conventional technologies.

One of the measuring bridges, namely measuring bridge 113 is shown in detail in FIG. 11. This measuring bridge serves to gain a signal designated by "−Y". It comprises four resistors $R_{-Y1}$, $R_{-Y2}$, $R_{-Y3}$ and $R_{-Y4}$, wherein a connection to ground is provided between the resistors $R_{-Y2}$ and $R_{-Y3}$, a connection for an operating voltage $U_B$ is provided between the resistors $R_{-Y1}$ and $R_{-Y4}$ and a measuring signal $U_{-Y}$ is derived between the resistors $R_{-Y1}$ and $R_{-Y2}$, on the one hand, and $R_{-Y3}$ and $R_{-Y4}$, on the other hand,.

The other measuring bridges 112, 111 and 114 are correspondingly provided for deriving signals "+X", "+Y" and "−X", and they provide corresponding voltage signals $U_{+X}$, $U_{+Y}$ and $U_{-X}$.

From the signals $U_{+Y}$, $U_{+X}$, $U_{-Y}$ and $U_{-X}$ which are derived from measuring bridges 111, 112, 113 and 114, values $Y_S$, $X_S$ and $Z_S$ are calculated according to the following formula:

$$Y_S = U_{+Y} - U_{-Y}$$

$$X_S = U_{+X} - U_{-X}$$

$$Z_S = U_{+X} + U_{-X} + U_{+Y} + U_{-Y}$$

Signals $Y_S$, $X_S$ and $Z_S$ represent deflections of the sensing tip in the directions y, x and z, respectively.

In the embodiments described hereinbefore, the deflection measuring system is capable of determining the extent of deflection of the support for the sensing stylus from its rest position. In particular, it is possible to scan the sensing tip along a workpiece surface with a given contact force. However, it is also possible to use as a deflection measuring system a switching measuring system, which merely switches between a condition, which indicates a contacting of the workpiece surface and another condition, which indicates a non-contacting of the workpiece surface.

It is also possible to design the measuring system such that the sensing stylus is held so as to oscillate about a rest position, wherein a resonant circuit maintains such oscillation during the measuring operation. An approach of the sensing tip to the workpiece surface or a contact of the workpiece surface by the sensing tip results in an attenuation and possibly in a frequency shift of the oscillation, which may be also detected.

In each of the foregoing embodiments the sensing stylus extends substantially on the optical axis of the inspection optics. However, it is also possible that the optical axis of the inspection optics be disposed so as to be offset with respect to the direction of extension of the sensing stylus or that a buckled or bent sensing stylus having two or more directions of extension be employed. What is essential for the invention is that the inspection optics inspects the sensing stylus tip "through" a supporting structure of the sensing stylus.

What is claimed is:

1. A touch probe for a coordinate measuring apparatus, comprising:
 a touch probe chassis adapted to be attached to the coordinate measuring apparatus;
 a support for a sensing stylus which is mounted on the touch probe chassis so as to be deflectable from a rest position and on which the sensing stylus is mountable for contacting a workpiece;
 a deflection measuring system for detecting a deflection of the support for the sensing stylus with respect to the touch probe chassis; and
 an inspection optics separate from the deflection measuring system, for the inspecting of a tip of the sensing stylus and of a region around the tip;
 wherein at least one of the support for the sensing stylus and the touch probe chassis comprises a transverse support which extends transversely to a direction of extension of the sensing stylus and which is transparent to light in at least a portion thereof and which is disposed in a beam path of the inspection optics.

2. The touch probe according to claim 1, wherein the sensing stylus is mounted on the support for the sensing stylus, and wherein an object plane of the inspection optics is disposed in a region of the tip of the sensing stylus.

3. The touch probe according to claim 2, wherein a first distance D1 between the transverse support and the object plane, and a second distance D2 between the transverse support and the tip of the sensing stylus satisfy the following relation:

$$0.5 < |D1/D2| < 2.0.$$

4. The touch probe according to claim 1, wherein the transverse support is disposed between an objective lens of the inspection optics and a tip of the touch probe.

5. The touch probe according to claim 1, wherein the transverse support is made of a transparent material.

6. The touch probe according to claim 1, wherein the transverse support comprises at least one aperture for a passage of light to the inspection optics, wherein, in particular, a plurality of apertures are distributed in a circumferential direction about a longitudinal axis of the sensing stylus.

7. The touch probe according to claim 1, wherein at least one of the support for the sensing stylus, and a connecting region between the support for the sensing stylus and the touch probe chassis are disposed within the beam path of the inspection optics.

8. The touch probe according to claim 1, wherein the sensing stylus extends substantially along a main axis of the inspection optics.

9. The touch probe according to claim 1, wherein the transverse support is elastically deformable and elastically couples the touch probe chassis and the support for the sensing stylus.

10. The touch probe according to claim 9, wherein the touch probe chassis and the support for the sensing stylus are integrally made from one block of material, in particular, from a monocrystal.

11. The touch probe according to claim 9, wherein the touch probe chassis and the support for the sensing stylus are integrally made from a monocrystal.

12. The touch probe according to claim 9, wherein the deflection measuring system detects an elastic deformation of the transverse support to determine the deflection of the support for the sensing stylus with respect to the touch probe chassis.

13. The touch probe according to claim 12, wherein the deflection measuring system comprises at least one strain sensor to detect the elastic deformation of the transverse support.

14. The touch probe according to claim 12, wherein the deflection measuring system comprises at least one strain sensor of a piezoelectric material to detect the elastic deformation of the transverse support.

15. The touch probe according to claim 12, wherein the deflection measuring system comprises at least one resistance strain gauge to detect the elastic deformation of the transverse support.

16. A coordinate measuring apparatus comprising a workpiece mount and a touch probe which is movable in space with respect to the workpiece mount and is adapted for contacting a workpiece mountable on the workpiece mount, wherein the touch probe comprises:

a touch probe chassis, a support for a sensing stylus which is mounted on the touch probe chassis so as to be deflectable from a rest position and on which the sensing stylus is mountable for contacting a workpiece, a deflection measuring system for detecting a deflection of the support for the sensing stylus with respect to the touch probe chassis, and an inspection optics separate from the deflection measuring system, for the inspecting of a tip of the sensing stylus and of a region around the tip, wherein at least one of the support for the sensing stylus and the touch probe chassis comprises a transverse support which extends transversely to a direction of extension of the sensing stylus and which is transparent to light in at least a portion thereof and which is disposed in a beam path of the inspection optics.

17. A method of contacting a workpiece, comprising:

providing a coordinate measuring apparatus comprising a workpiece mount with the workpiece mounted thereon and a touch probe which is movable in space with respect to the workpiece mount, wherein the touch probe comprises:

a touch probe chassis, a sensing stylus a support for the sensing stylus which is mounted on the touch probe chassis so as to be deflectable from a rest position, a deflection measuring system for detecting a deflection of the support for the sensing stylus with respect to the touch probe chassis, and an inspection optics separate from the deflection measuring system, for the inspecting of a tip of the sensing stylus and of a region around the tip, wherein at least one of the support for the sensing stylus and the touch probe chassis comprises a transverse support which extends transversely to a direction of extension of the sensing stylus and which is transparent to light in at least a portion thereof and which is disposed in a beam path of the inspection optics;

and wherein the method comprises:

moving the touch probe relative to the workpiece in space, in particular, step-by-step, to bring the tip of the sensing stylus into contact with the workpiece at a desired location, enabling during the movement a user inspection of the position of the tip of the sensing stylus with respect to the workpiece by means of an inspection optics, changing a moving path of the touch probe relative to the workpiece in dependence upon at least one user input.

* * * * *